(12) United States Patent
Okamoto et al.

(10) Patent No.: US 8,195,010 B2
(45) Date of Patent: Jun. 5, 2012

(54) VIDEO MATCHING APPARATUS AND VIDEO MATCHING METHOD

(75) Inventors: Jun Okamoto, Tokyo (JP); Keishirou Watanabe, Tokyo (JP); Takaaki Kurita, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 607 days.

(21) Appl. No.: 12/308,152

(22) PCT Filed: Apr. 26, 2007

(86) PCT No.: PCT/JP2007/059060
§ 371 (c)(1),
(2), (4) Date: Aug. 7, 2009

(87) PCT Pub. No.: WO2007/148479
PCT Pub. Date: Dec. 27, 2007

(65) Prior Publication Data
US 2009/0303386 A1     Dec. 10, 2009

(30) Foreign Application Priority Data

Jun. 21, 2006   (JP) .................................. 2006-171231

(51) Int. Cl.
*G06K 9/03*  (2006.01)
(52) U.S. Cl. ....... 382/309; 382/274; 382/275; 358/3.26; 358/3.27
(58) Field of Classification Search .................. 382/274, 382/275, 309; 358/3.26, 3.27
See application file for complete search history.

(56) References Cited

U.S. PATENT DOCUMENTS

| 5,446,492 | A | 8/1995 | Wolf et al. |
| 6,343,146 | B1 | 1/2002 | Tsuruoka et al. |
| 7,154,951 | B2 * | 12/2006 | Wang ........................ 375/240.12 |
| 7,324,157 | B2 * | 1/2008 | Kuroda et al. ................ 348/448 |
| 7,532,804 | B2 * | 5/2009 | Kim .............................. 386/252 |

(Continued)

FOREIGN PATENT DOCUMENTS

CN       1166750 A       12/1997
(Continued)

OTHER PUBLICATIONS

"Objective Perceptual Video Quality Measurement Techniques for Digital Cable Television in the Presence of a Full Reference", ITU-T Recommendation J.144, 2004.

*Primary Examiner* — Yosef Kassa
(74) *Attorney, Agent, or Firm* — Blakely, Sokoloff, Taylor & Zafman

(57) ABSTRACT

A singular point removing unit (12) removes a singular point as invisible high-frequency component noise from a degraded video signal and a reference video signal. A pixel value correcting unit (13) removes pixel-value bias added to the degraded video signal. The singular point removing unit (12) transforms the video signal into a spatial frequency, removes a high-frequency component, and restores the video signal by inverse transformation, or removes a singular point by using an averaging filter or a median filter. The pixel value correcting unit (13) obtains the correlation between the pixel values of the reference video signal and the corresponding pixel values of the degraded video signal, and corrects the pixel values of the reference video signal or the degraded video signal so as to match the pixel values of the degraded video signal with the pixel values of the reference video signal.

14 Claims, 7 Drawing Sheets

U.S. PATENT DOCUMENTS 7,684,487 B2 * 3/2010 Nakaya et al. ........... 375/240.16

FOREIGN PATENT DOCUMENTS

| | | |
|---|---|---|
| CN | 1788499 A | 6/2006 |
| EP | 0 809 409 A1 | 11/1997 |
| EP | 1 622 395 A1 | 2/2006 |
| JP | 05-176179 | 7/1993 |
| JP | 05-260529 A | 10/1993 |
| JP | 11-109905 A | 4/1999 |
| JP | 11-208645 A | 11/1999 |
| JP | 2005-286689 | 10/2005 |
| KR | 1998-017213 | 6/1998 |

* cited by examiner

VIDEO MATCHING APPARATUS AND VIDEO MATCHING METHOD

The present patent application is a Utility claiming the benefit of Application No. PCT/JP2007/059060, filed Apr. 26, 2007.

TECHNICAL FIELD

The present invention relates to a video matching apparatus and video matching method which match a degraded video signal as an assessment target with a reference video signal, which is identical to the degraded video signal before degradation, on the basis of the physical feature amount of the degraded video signal and the reference video signal before the estimation of the subjective quality of the degraded video signal.

BACKGROUND ART

Conventionally, video quality assessment is basically so-called subjective quality assessment, which measures the quality perceived by a user when he/she actually observes a video. Subjective quality assessment, however, requires a dedicated facility and enormous time and labor. Demands have therefore arisen for objective assessment methods of estimating subjective qualities from the amounts physically measured from videos to perform video quality assessment more efficiently.

According to a conventional objective assessment method, it suffices to handle a stable signal for professional use, e.g., a signal for a broadcasting station, as a target video signal, and only an objective assessment algorithm is determined for standardization, as described in, for example, reference "Objective Perceptual Video Quality Measurement Techniques for Digital Cable Television in the Presence of a Full Reference", ITU-T Recommendation J.144, 2004".

For this reason, in matching processing to be performed before the estimation of the subjective quality of a degraded video signal, matching between the degraded video signal and a reference video signal can be implemented by performing the format conversion processing of matching the format of the degraded video signal with that of the reference video signal before degradation and the position/synchronization matching processing of matching the time and position of the degraded video signal with those of the reference video signal (see, for example, the specification of U.S. Pat. No. 5,446,492).

DISCLOSURE OF INVENTION

Problem to be Solved by the Invention

When the quality of a video is assessed by using a signal level (monitor signal) at which a video is actually viewed in an environment in which, for example, the video is viewed with a personal computer (PC), noise or bias is sometimes added to a video signal due to processing in the player, the characteristics/performance of the monitor output board, or the like. Some noise or bias cannot be perceived by human eyes and have no influence on subjective quality. If such noise or bias which cannot be perceived by human eyes is included as a quality degradation factor in calculation, the quality degradation of a video is overestimated, resulting in a deterioration in the estimation accuracy of subjective quality.

The present invention has been made to solve the above problem, and has as its object to provide a video matching apparatus and video matching method which can remove even noise or bias added to a degraded video signal.

Means of Solution to the Problem

A video matching apparatus of the present invention comprises a position/synchronization matching unit which eliminates a shift on a time axis and a positional shift between a degraded video signal and a reference video signal which is identical to the degraded video signal before degradation, and a singular point removing unit which removes a singular point as invisible high-frequency component noise from the degraded video signal.

In addition, a video matching apparatus of the present invention comprises a position/synchronization matching unit which eliminates a shift on a time axis and a positional shift between a degraded video signal and a reference video signal which is identical to the degraded video signal before degradation, and a pixel value correcting unit which removes pixel-value bias added the degraded video signal.

A video matching method of the present invention comprises the position/synchronization matching step of eliminating a shift on a time axis and a positional shift between a degraded video signal and a reference video signal which is identical to the degraded video signal before degradation, and the singular point removing step of removing a singular point as invisible high-frequency component noise from the degraded video signal.

In addition, a video matching method of the present invention comprises the position/synchronization matching step of eliminating a shift on a time axis and a positional shift between a degraded video signal and a reference video signal which is identical to the degraded video signal before degradation, and the pixel value correcting step of removing pixel-value bias added the degraded video signal.

Effects of the Invention

As described above, according to the present invention, even if noise is added to a degraded video signal due to postprocessing in the player or the characteristics/performance of the monitor output board, the noise can be removed by performing the singular point removable processing of removing a singular point as invisible high-frequency component noise from the degraded video signal. As a consequence, the present invention can properly assess the quality of a degraded video signal when the quality of a video is assessed at a signal level (monitor signal) at which the video is actually viewed.

In addition, according to the present invention, even if bias is added to a degraded video signal due to post filter processing in the player or the color correction function of the monitor output board, the bias can be removed by performing the pixel value correction processing of removing the pixel-value bias added to the degraded video signal. As a consequence, the present invention can properly assess the quality of a degraded video signal when the quality of a video is assessed at a signal level (monitor signal) at which the video is actually viewed.

Furthermore, according to the present invention, performing singular point removal processing for a reference video signal in addition to a degraded video signal can eliminate the adverse effect of the singular point removal processing on subjective quality estimation accuracy which is newly caused when the singular point removal processing is applied to the degraded video signal. As a consequence, it is possible to improve the subjective quality estimation accuracy as compared with a case in which singular point removal processing is performed for only a degraded video signal.

In addition, the present invention outputs a singular point removal amount as input information for a subjective quality estimation step as a next step. With this operation, when unexpected processing is performed in singular point removal processing, it is possible to consider the influences of the unexpected processing on subjective quality estimation accuracy in the subjective quality estimation step as the next step.

Moreover, the present invention outputs correction information used for the correction of a pixel value as input information for the subjective quality estimation step as the next step. With this operation, when unexpected processing is performed in pixel value correction processing, it is possible to consider the influences of the unexpected processing on subjective quality estimation accuracy in the subjective quality estimation step as the next step.

BRIEF DESCRIPTION OF DRAWINGS

FIG. 5A is a view for explaining another example of the operation of the singular point removal processing in the first embodiment of the present invention, showing a 3×3 neighborhood averaging filter as an example of a noise removal filter;

FIG. 5B is a view for explaining another example of the operation of the singular point removal processing in the first embodiment of the present invention, showing a 3×3 neighborhood weight averaging filter as an example of the noise removal filter;

FIG. 5C is a view for explaining another example of the operation of the singular point removal processing in the first embodiment of the present invention, showing a cross averaging filter as an example of the noise removal filter;

BEST MODE FOR CARRYING OUT THE INVENTION

First Embodiment

Figure 1:
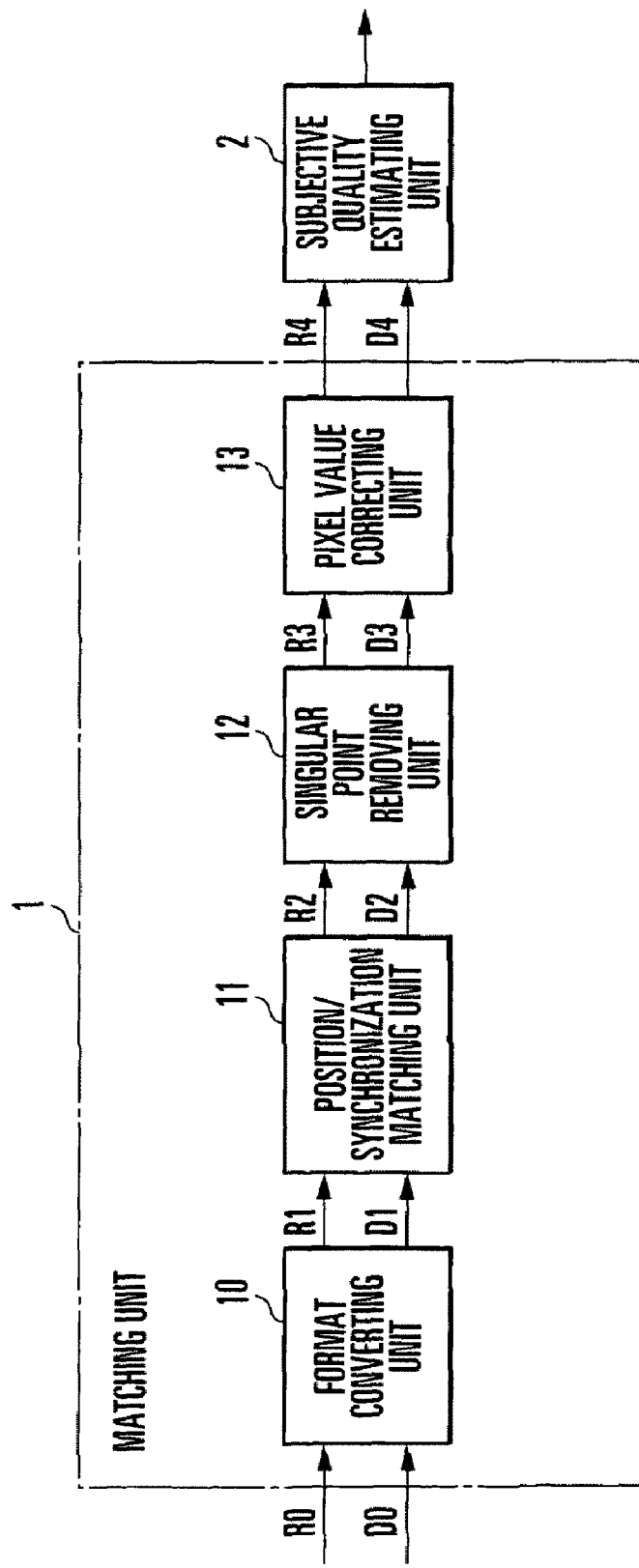
FIG. 1 is a block diagram showing the arrangement of a video matching apparatus according to the first embodiment of the present invention.

The embodiments of the present invention will be described below with reference to the accompanying drawings. FIG. 1 is a block diagram showing the arrangement of a video matching apparatus according to the first embodiment of the present invention.

The video matching apparatus includes a matching unit 1 and a subjective quality estimating unit 2. The matching unit 1 outputs a matched reference video signal R4 and a matched degraded video signal D4 by applying signal processing to both an input degraded video signal D0 which has been degraded by coding or a loss in a network and an input reference video signal R0 which is identical to the degraded video signal D0 before degradation. The subjective quality estimating unit 2 estimates the subjective quality of the matched degraded video signal D4 by measuring the feature amounts of the matched reference video signal R4 and matched degraded video signal D4. Note that the apparatus in FIG. 1 forms both a video matching apparatus and an objective video quality assessing apparatus.

Figure 2:
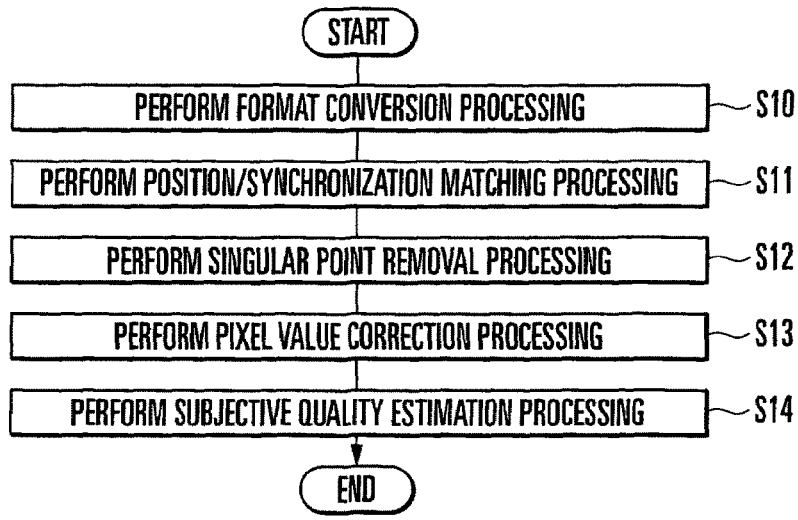
FIG. 2 is a flowchart showing the operation of the video matching apparatus according to the first embodiment of the present invention.

The matching unit 1 includes a format converting unit 10, a position/synchronization matching unit 11, a singular point removing unit 12, and a pixel value correcting unit 13. FIG. 2 is a flowchart showing the operation of the video matching apparatus.

The format converting unit 10 performs the format conversion processing of matching the format of the reference video signal R0 with that of the degraded video signal D0 (step S10 in FIG. 2).

The position/synchronization matching unit 11 performs the position/synchronization matching processing of eliminating the shift on the time axis and positional shift between a reference video signal R1 and a degraded video signal D1, which have been subjected to signal processing by the format converting unit 10 (step S11 in FIG. 2).

The singular point removing unit 12 performs the singular point removal processing of removing a singular point (noise) from the a degraded video signal D2 subjected to signal processing by the position/synchronization matching unit 11 (step S12 in FIG. 2). Note that the singular point removing unit 12 also performs singular point removal processing for a reference video signal R2 for the following reason.

The pixel value correcting unit 13 performs the pixel value correction processing of removing the bias (pixel-value bias) added to a reference video signal R3 subjected to signal processing by the singular point removing unit 12 (step S13 in FIG. 2).

The operation of the matching unit 1 in each processing will be described in detail below. The format converting unit 10 converts the degraded video signal D0 to match the format of the degraded video signal D0 with that of the reference video signal R0, when the signal format, size, and aspect ratio of the reference video signal R0 differ from those of the degraded video signal D0. If, for example, the reference video signal R0 is in the uncompressed YUV format and the degraded video signal D0 is in the uncompressed RGB format, it suffices to convert the degraded video signal D0 by using the conversion formula defined by ITU-R (International Telecommunications Union Radiocommunication Sector) recommendation BT-601 "STUDIO ENCODING PARAMETERS OF DIGITAL TELEVISION FOR STANDARD 4:3 AND WIDE-SCREEN 16:9 ASPECT RATIOS". Note that if the degraded video signal D0 is in the compressed format, it is necessary to convert the format into an uncompressed format in advance.

If the size or aspect ratio of the reference video signal R0 differs from that of the degraded video signal D0, the format converting unit 10 converts the degraded video signal D0 to match its size or aspect ratio with that of the reference video signal R0. If the sizes or aspect ratios of the reference video signal R0 and degraded video signal D0 are in an integer multiple relationship, calculations can be performed with a simple integer multiple. If, however, they are not in an integer multiple relationship, it is necessary to convert the size of the degraded video signal D0 to an arbitrary size. In this case, it suffices to convert the size to an arbitrary size as in image resolution conversion described in chapter 7 of reference "Easy-to-Understand Digital Image Processing—from Filter Processing to DCT & Wavelet", CQ publishing Co., 1996. Note that if the luminance occurrence range or color occurrence range of the reference video signal R0 differs from that of the degraded video signal D0 because of the difference in format between the reference video signal R0 and the degraded video signal D0, matching processing is also performed to match their occurrence ranges with each other, as needed.

Figure 3A:
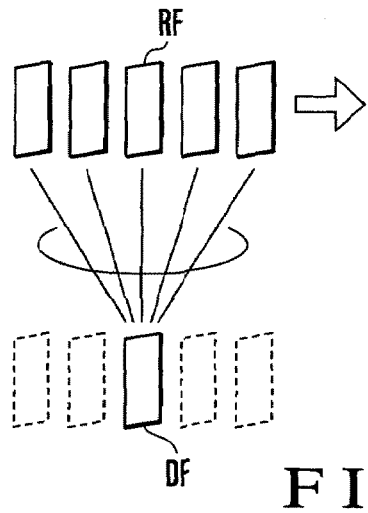
FIGS. 3A and 3B are views for explaining the operation of a position/synchronization matching unit in the first embodiment of the present invention, showing the concept of pixel matching between a reference video signal and a degraded video signal.
Figure 3B:
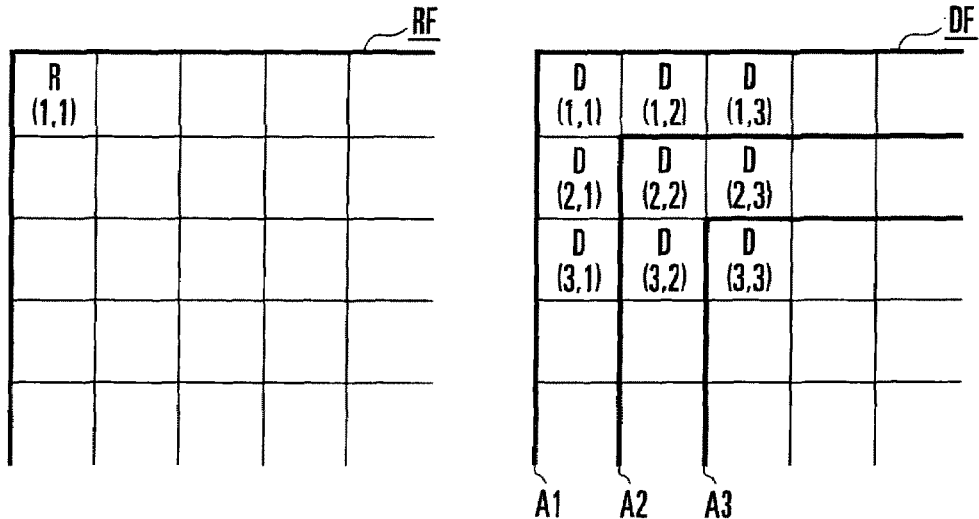

In order to match the pixel positions of the frame of the reference video signal R1, subjected to format conversion by the format converting unit 10, with those of the degraded video signal D1, the position/synchronization matching unit 11 obtains the difference values between a target frame DF of the degraded video signal D1 and a target frame RF of the reference video signal R1 shown in FIG. 3A. At this time, as shown in FIG. 3B, the position/synchronization matching unit 11 obtains the total sum of the difference values between the respective pixels of the target areas of the frames RF and DF while shifting the target area of the target frame DF of the degraded video signal D1 which corresponds to the target area of the target frame RF of the reference video signal R1 with coordinates R(1, 1) of the target frame RF being located at the upper left of the target area. Referring to FIG. 3B, each square of the frames RF and DF represents a pixel.

The position/synchronization matching unit 11 shifts the target area of the degraded video signal D1 such that coordinates D(1, 1), D(1, 2), D(1, 3), D(2, 1), D(2, 2), D(2, 3), D(3, 1), D(3, 2), and D(3, 3) each are located at the upper left of each target area, and obtains the total sum of the difference values between the respective pixels of each of the target areas and the target area of the reference video signal R1. Referring to FIG. 3B, reference symbol A1 denotes a target area with the coordinates D(1, 1) located at the upper left; A2, a target area with the coordinates D(2, 2) located at the upper left; and A3, a target area with the coordinates D(3, 3) located at the upper left.

Upon obtaining the total sum of the difference values between the respective pixels of the current target frame RF of the reference video signal R1 and the target frame DF of the degraded video signal D1, the position/synchronization matching unit 11 obtains the total sum of the difference values between the respective pixels (the total sum of the difference values between the respective pixels will be abbreviated as a difference value hereinafter) of a new target frame RF which is adjacent to the above target frame RF and the target frame DF of the degraded video signal D1. The position/synchronization matching unit 11 obtains the difference values between one target frame DF of the degraded video signal D1 and a plurality of target frames RF of the reference video signal R1 for each frame FR and each target area of the target frame DF, and outputs the reference video signal R2 and the degraded video signal D2 in a matched state to the singular point removing unit 12, with the state in which the difference values are minimized being a state in which the reference video signal R1 is matched most with the degraded video signal D1 (the times and positions are matched).

The singular point removing unit 12 receives the reference video signal R2 and the degraded video signal D2 which have been subjected to position/synchronization matching processing by the position/synchronization matching unit 11, and removes a singular point as invisible high-frequency component noise from the degraded video signal D2. This singular point is noise independent of compression/decompression which is added due to postprocessing in the player or the characteristics/performance of the monitor output board.

Figure 4A:
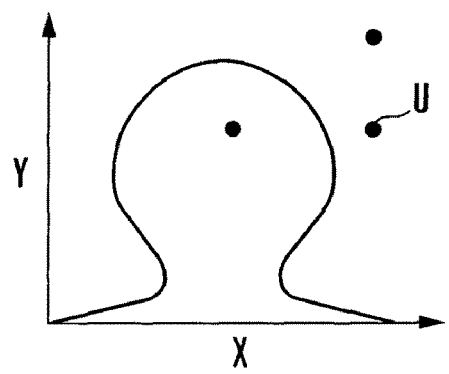
FIG. 4A is a graph for explaining an example of the operation of a singular point removing unit in the first embodiment of the present invention, showing a frame of a degraded video signal.
Figure 4B:
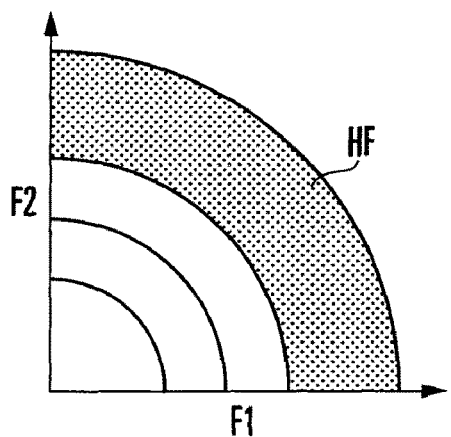
FIG. 4B is a graph for explaining an example of the operation of the singular point removing unit in the first embodiment of the present invention, showing the spatial frequency of the degraded video signal.
Figure 4C:
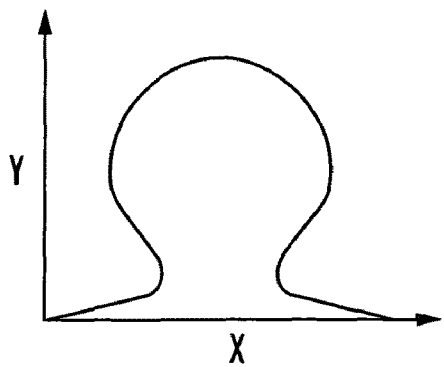
FIG. 4C is a graph for explaining an example of the operation of the singular point removing unit in the first embodiment of the present invention, showing a frame of a degraded video signal as a result of transformation from a spatial frequency after the removal of a high-frequency component.

FIGS. 4A to 4C are graphs for explaining an example of the operation of the singular point removing unit 12, showing an example of high-frequency component removal processing for the degraded video signal D2. Referring to each of FIGS. 4A and 4C, the abscissa is the X-axis, and the ordinate is the Y-axis. Referring to FIG. 4B, the abscissa represents a horizontal frequency F1, and the ordinate, a vertical frequency F2. The horizontal frequency F1 gradually decreases in the left direction, and gradually increases in the right direction. The vertical frequency F2 gradually decreases in the lower direction, and gradually increases in the upper direction.

The singular point removing unit 12 converts entirely or partly the frame of the degraded video signal shown in, for example, FIG. 4A into a spatial frequency as shown in FIG. 4B by a two-dimensional Fourier transform or the like, and removes a high-frequency component HF. The singular point removing unit 12 then performs an inverse two-dimensional Fourier transform to restore the degraded video signal as shown in FIG. 4C, thereby removing a singular point U from the degraded video signal.

Alternatively, letting X(m, n) be the value of a target pixel in the frame of a degraded video signal, the singular point removing unit 12 obtains a value Y(m, n) of the same target pixel after the removal of a singular point according to the following equation and removes the singular point.

$$Y(m, n) = \sum_{i=-k}^{i=k} \sum_{j=-l}^{j=l} X(m+i, n+j)W(i, j) \qquad (1)$$

where W(i, j) represents a filter function. Assuming k=l=1 as values implementing the calculation of equation (1), the 3×3 neighborhood averaging filter shown in FIG. 5A, the 3×3 neighborhood weight averaging filter shown in FIG. 5B, the cross averaging filter shown in FIG. 5C, and the like are conceivable.

Figures 5A, 5B, 5C:
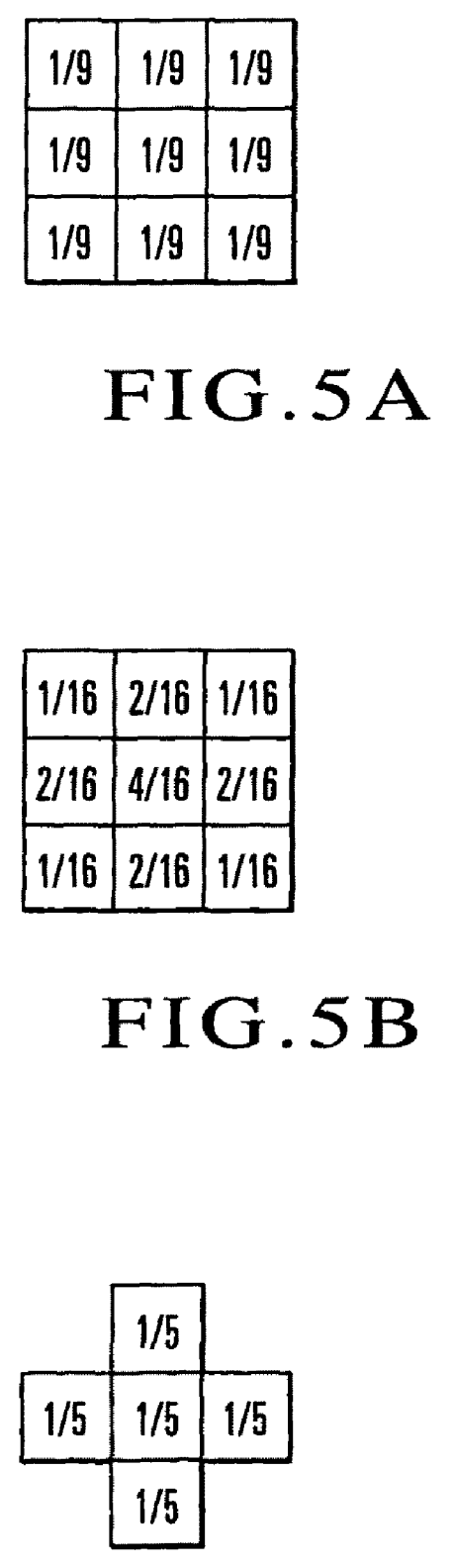

The 3×3 neighborhood averaging filter is applied to the central pixel of 3 pixels in the horizontal direction×3 pixels in the vertical direction in FIG. 5A as a target pixel, and obtains a value Y(m, n) of the target pixel by setting a filter function W(i, j) of each pixel as shown in FIG. 5A. Likewise, the 3×3 neighborhood weight averaging filter is designed to obtain the value Y(m, n) of a target pixel by setting the filter function W(i, j) as shown in FIG. 5B. The cross averaging filter is applied to the central pixel of a cross comprising five pixels as a target pixel, and obtains the value Y(m, n) of the target pixel by setting the filter function W(i, j) of each pixel as shown in FIG. 5C.

Figure 6A:
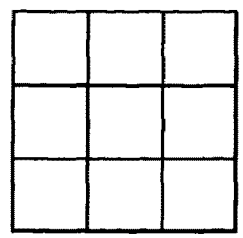
FIG. 6A is a view for explaining another example of the operation of the singular point removal processing in the first embodiment of the present invention, showing a 3×3 neighborhood median filter as an example of the noise removal filter.
Figure 6B:
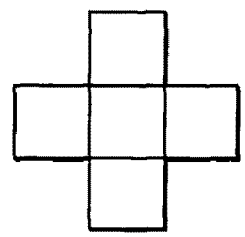
FIG. 6B is a view for explaining another example of the operation of the singular point removal processing in the first embodiment of the present invention, showing a cross median filter as an example of the noise removal filter.
Figure 6C:
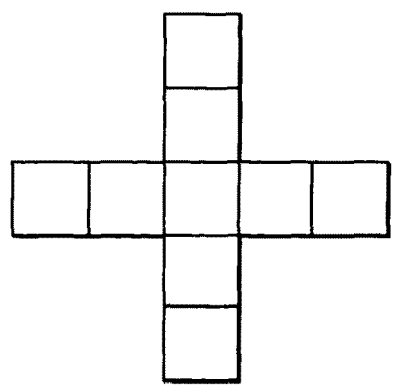
FIG. 6C is a view for explaining another example of the operation of the singular point removal processing in the first embodiment of the present invention, showing a long cross median filter as an example of the noise removal filter.

In addition, as a filter for implementing the calculation of equation (1), the 3×3 neighborhood median filter shown in FIG. 6A, the cross median filter shown in FIG. 6B, or the long cross median filter shown in FIG. 6C can be used. The 3×3 neighborhood median filter is applied to the central pixel of 3 pixels in the horizontal direction×3 pixels in the vertical direction in FIG. 6A as a target pixel, and obtains the median of nine pixel values as the value Y(m, n) of the target pixel. The cross median filter is applied to the central pixel of a cross comprising five pixels in FIG. 6B as a target pixel, and obtains the median of the five pixel values as the value Y(m, n) of the target pixel. The long cross median filter is applied to the central pixel of a cross comprising nine pixels in FIG. 6C as a target pixel, and obtains the median of the nine pixel values as the value Y(m, n) of the target pixel.

Note that a degraded video signal D3 subjected to signal processing by the singular point removing unit 12 is identical to the degraded video signal D2 before it is input to the singular point removing unit 12 except that another degradation is added. If, therefore, subject quality is estimated by using the degraded video signal D3 subjected to signal processing by the singular point removing unit 12 and the reference video signal R2 not subjected to signal processing, the estimation accuracy deteriorates. For this reason, the singular point removing unit 12 performs the same signal processing as that for the degraded video signal D2 with respect to the reference video signal R2 input from the position/synchronization matching unit 11 to remove a singular point. This makes it possible to derive a proper assessment value when the subjective quality estimating unit 2 estimates subjective quality in the subsequent steps.

As filters used by the singular point removing unit 12, various types of low-pass filters are conceivable. The examination made by the present inventor revealed that it was proper to use the cross median filter in FIG. 6B for singular point removal processing. This was because an optimal estimation accuracy could be obtained in consideration of the calculation amount, which is not very large, and a combination of more schemes and devices.

In order to remove the bias added to a degraded video signal, the pixel value correcting unit 13 obtains the relationship between the pixels of the reference video signal R3 subjected to singular point removal processing by the singular point removing unit 12 and the corresponding pixels of the degraded video signal D3, and corrects the pixel values of the degraded video signal D3 so as to match the pixel values of the degraded video signal D3 with the pixel values of the reference video signal R3 as a whole. A bias is added to the degraded video signal D3 due to, for example, decoding processing in the player, post-filter processing after decoding, or the color correction function of the monitor output board.

Figure 7A:
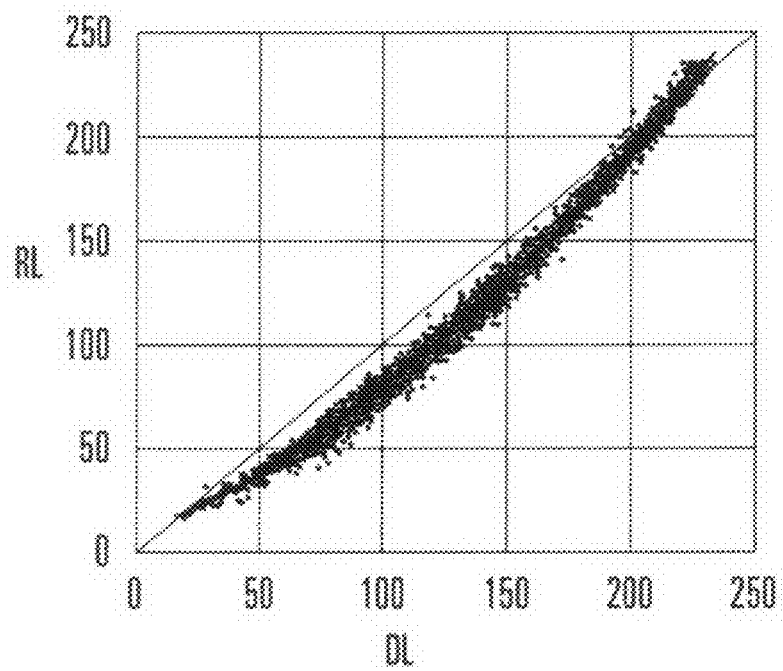
FIG. 7A is a graph for explaining the operation of a pixel value correcting unit in the first embodiment of the present invention, showing the influences of processing at the time of decoding on a degraded video signal.
Figure 7B:
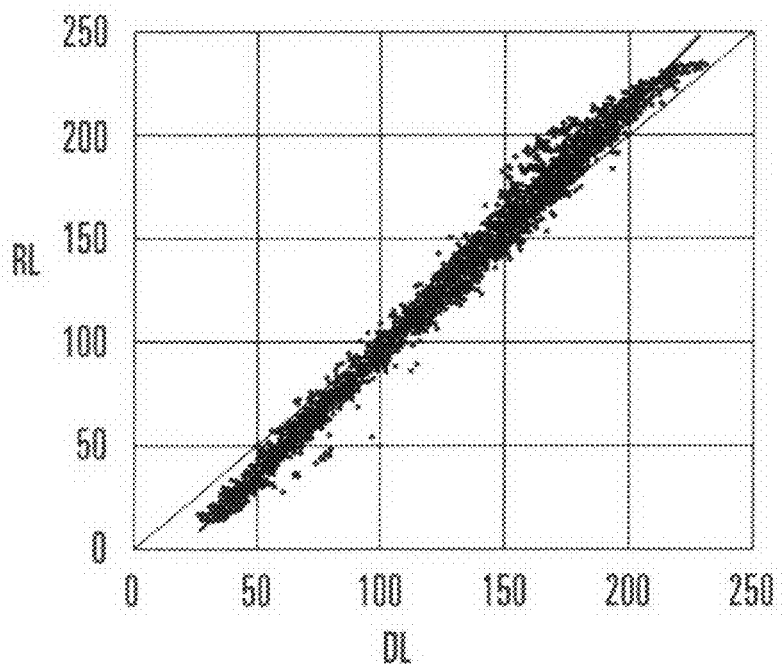
FIG. 7B is a graph for explaining the operation of the pixel value correcting unit in the first embodiment of the present invention, showing the influences of processing after decoding on a degraded video signal.

The pixel value correcting unit 13 obtains the relationship between the pixel values of the reference video signal R3 and the corresponding pixel values of the degraded video signal D3, as shown in FIGS. 7A and 7B. FIG. 7A shows the influences of processing at the time of decoding on a degraded video signal, and is a graph obtained by plotting the relationship between the pixel values of a reference video signal and those of a degraded video signal after going through post-filter processing in the player, with the abscissa representing a luminance DL of the degraded video signal, and the ordinate, a luminance value RL of the reference video signal. In the case shown in FIG. 7A, the relationship between the pixel values of the reference video signal and the corresponding pixel values of the degraded video signal is represented by a second-order regression equation.

FIG. 7B shows the influences of processing after decoding on a degraded video signal, and is a graph obtained by plotting the relationship between the pixel values of a reference video signal and those of a degraded video signal after going through the color correction function of the monitor output board. In the case shown in FIG. 7B, the relationship between the pixel values of the reference video signal and the corresponding pixel values of the degraded video signal is represented by a first-order regression equation.

The pixel value correcting unit 13 derives a regression equation from the relationship between the pixel values of the reference video signal R3 and the corresponding pixel values of the degraded video signal D3, and corrects the pixel values of the degraded video signal D3 by using the regression equation. The pixel value correcting unit 13 outputs the reference video signal R3 input from the singular point removing unit 12 as the matched reference video signal R4 to the subjective quality estimating unit 2, and also outputs the degraded video signal D3, whose pixel values are corrected, as the matched degraded video signal D4 to the subjective quality estimating unit 2. As a regression equation to be derived by the pixel value correcting unit 13, a linear expression, a quadratic expression, a polynomial, an exponential function, a log function, or a combination thereof is conceivable. According to the examination made by the present inventor, in many cases, the above operation was implemented by approximation using a quadratic expression. In this case, therefore, the regression is performed by using a quadratic expression. In this embodiment, the degraded video signal D3 is matched with the reference video signal R3. However, it suffices to correct the pixel values of the reference video signal R3 by matching the reference video signal R3 with the degraded video signal D3.

The subjective quality estimating unit 2 estimates the subjective quality of a degraded video signal by measuring the feature amounts of the matched reference video signal R4 and matched degraded video signal D4 (step S14 in FIG. 2). An example of the subjective quality estimating unit 2 is disclosed in, for example, reference "Okamoto, Hayashi, Takahashi, and Kurita, "Proposal for an objective video quality assessment method that takes spatio-temporal feature amounts into consideration", THE TRANSACTIONS OF THE IEICE, Vol. J88-B, No. 4, pp. 813-823, 2005".

As described above, according to this embodiment, providing the singular point removing unit 12 makes it possible to remove even noise added to a degraded video signal due to postprocessing in the player or the characteristics/performance of the monitor output board. In addition, according to the embodiment, providing the pixel value correcting unit 13 makes it possible to remove even bias added to a degraded video signal due to post-filter processing in the player or the color correction function of the monitor output board. As a consequence, the embodiment can properly assess the quality of a degraded video signal.

Second Embodiment

Figure 8:
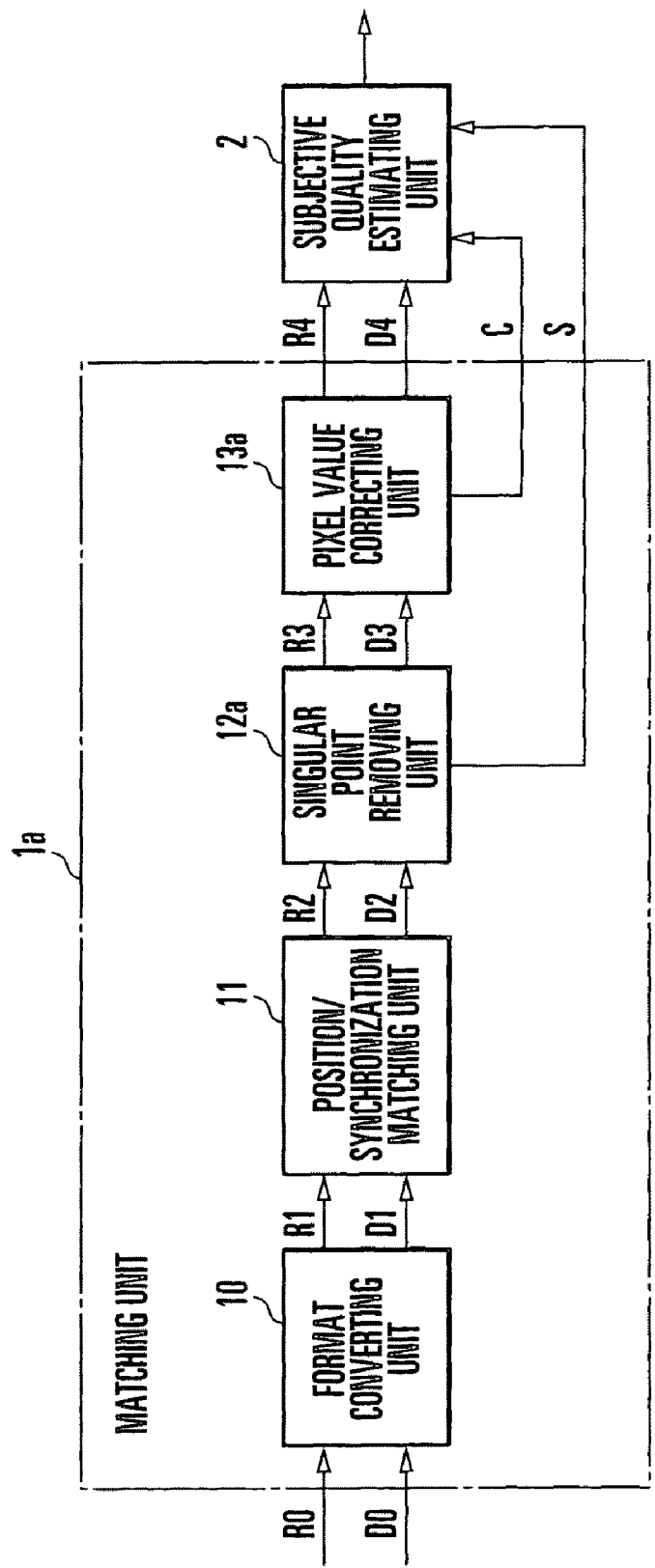
FIG. 8 is a block diagram showing the arrangement of a video matching apparatus according to the second embodiment of the present invention.

The second embodiment of the present invention will be described next. FIG. 8 is a block diagram showing the arrangement of a video matching apparatus according to the second embodiment of the present invention. The same reference numerals as in FIG. 1 denote the same components in FIG. 8.

A singular point removing unit 12a of a matching unit 1a of this embodiment operates in the same manner as the singular point removing unit 12 of the first embodiment, and outputs a singular point removal amount S (e.g., the sum of pixel value change amounts before and after the removal of a singular point from a degraded video signal–the sum of pixel value change amounts before and after the removal of a singular point from a reference video signal) in singular point removal processing as input information to a subjective quality estimating unit 2.

A pixel value correcting unit 13a operates in the same manner as the pixel value correcting unit 13 of the first embodiment, and outputs correction information C (e.g., a regression equation or coefficients of a regression equation) in pixel value correction processing as input information to the subjective quality estimating unit 2.

With this operation, when the subjective quality estimating unit 2 performs subjective quality estimation processing, it is possible to inform the subjective quality estimating unit 2 of the degree of matching processing so as to allow the subjective quality estimating unit 2 to consider how much a degraded video signal is changed by matching processing by the matching unit 1a. The first embodiment gives no consideration to the removal of a singular point which can be perceived by human eyes or the correction of pixel values. However, when the singular point removing unit 12 or the pixel value correcting unit 13 performs unexpected processing, the operation may influence subjective quality estimation processing by the subjective quality estimating unit 2. For this reason, this embodiment allows the subjective quality estimating unit 2 to consider unexpected processing by informing the subjective quality estimating unit 2 of the degree of matching processing.

Note that the video matching apparatuses of the first and second embodiments can be implemented by a computer including a CPU, a storage device, and an interface for external devices and programs which control these hardware resources. Programs for making such a computer to implement the video matching method of the present invention are provided while being recorded on a recording medium such as a flexible disk, CD-ROM, DVD-ROM, or memory card. The CPU writes the programs read out from the recording medium into the storage device, and executes the processing described in the first and second embodiments in accordance with the programs.

INDUSTRIAL APPLICABILITY

The present invention can be applied to an objective video quality assessment technique of estimating subjective quality by measuring the physical feature amount of a video signal.

The invention claimed is:

1. A video matching apparatus characterized by comprising:
    a position/synchronization matching unit which eliminates a shift on a time axis and a positional shift between a degraded video signal and a reference video signal which is identical to the degraded video signal before degradation; and
    a singular point removing unit which removes a singular point as invisible high-frequency component noise from the degraded video signal.

2. A video matching apparatus characterized by comprising:
    a position/synchronization matching unit which eliminates a shift on a time axis and a positional shift between a degraded video signal and a reference video signal which is identical to the degraded video signal before degradation; and
    a pixel value correcting unit which removes pixel-value bias added the degraded video signal.

3. A video matching apparatus according to claim 1, characterized by further comprising a subjective quality estimating unit which estimates subjective quality of the degraded video signal by measuring feature amounts of the degraded video signal and the reference video signal which have been subjected to signal processing by said position/synchronization matching unit and said singular point removing unit.

4. A video matching apparatus according to claim 2, characterized by further comprising a subjective quality estimating unit which estimates subjective quality of the degraded video signal by measuring feature amounts of the degraded video signal and the reference video signal which have been subjected to signal processing by said position/synchronization matching unit and said pixel value correcting unit.

5. A video matching method characterized by comprising:
    the position/synchronization matching step of eliminating a shift on a time axis and a positional shift between a degraded video signal and a reference video signal which is identical to the degraded video signal before degradation; and
    the singular point removing step of removing a singular point as invisible high-frequency component noise from the degraded video signal.

6. A video matching method according to claim 5, characterized in that the singular point removing step includes the step of removing the singular point from the reference video signal as well as from the degraded video signal.

7. A video matching method characterized by comprising:
    the position/synchronization matching step of eliminating a shift on a time axis and a positional shift between a degraded video signal and a reference video signal which is identical to the degraded video signal before degradation; and
    the pixel value correcting step of removing pixel-value bias added the degraded video signal.

8. A video matching method according to claim 5, characterized by further comprising the pixel value correcting step of removing pixel-value bias added to the degraded video signal.

9. A video matching method according to claim 5, characterized in that the singular point removing step includes one of the step of removing the singular point by transforming a video signal into a spatial frequency, removing the high-frequency component, and restoring the video signal by inverse transformation, and the step of removing the singular point by using an averaging filter or a median filter.

10. A video matching method according to claim 7, characterized in that the pixel value correcting step includes the step of obtaining a correlation between pixel values of the reference video signal and corresponding pixel values of the degraded video signal and correcting the pixel values of one of the reference video signal and the degraded video signal so as to match the pixel values of the degraded video signal with the pixel values of the reference video signal as a whole.

11. A video matching method according to claim 5, characterized by further comprising the subjective quality estimating step of estimating subjective quality of the degraded video signal by measuring feature amounts of the degraded video signal and the reference video signal which have been subjected to signal processing in the position/synchronization matching step and the singular point removing step.

12. A video matching method according to claim 11, characterized in that the singular point removing step includes the step of outputting a singular point removal amount as input information to the subjective quality estimating step as a next step.

13. A video matching method according to claim 7, characterized by further comprising the subjective quality estimating step of estimating subjective quality of the degraded video signal by measuring feature amounts of the degraded video signal and the reference video signal which have been subjected to signal processing in the position/synchronization matching step and the singular point removing step.

14. A video matching method according to claim 13, characterized in that the pixel value correcting step includes the step of outputting correction information used for correction of a pixel value as input information to the subjective quality estimating step as a next step.

* * * * *